Oct. 30, 1951  C. A. BOYD ET AL  2,573,245
METHOD OF ASSAYING SOLID CATALYSTS
Filed May 31, 1949
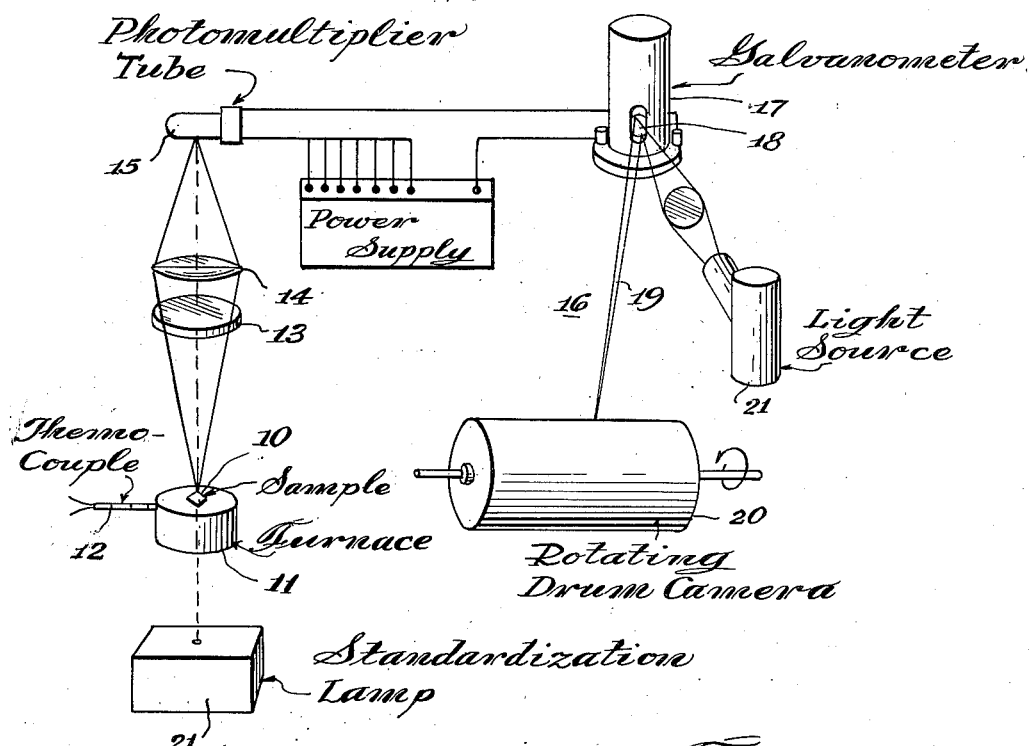
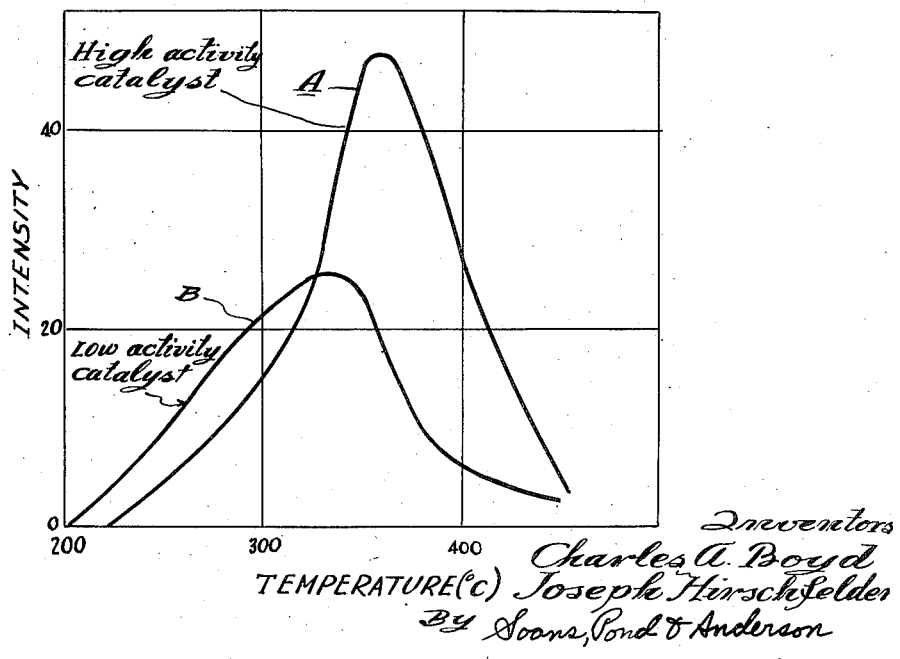
Inventors
Charles A. Boyd
Joseph Hirschfelder
By Soans, Pond & Anderson
Attorneys Patented Oct. 30, 1951

2,573,245

UNITED STATES PATENT OFFICE 2,573,245

METHOD OF ASSAYING SOLID CATALYSTS

Charles A. Boyd and Joseph Hirschfelder, Madison, Wis., assignors to Wisconsin Alumni Research Foundation, Madison, Wis., a corporation of Wisconsin Application May 31, 1949, Serial No. 96,338

11 Claims. (Cl. 250—71)

The present invention relates to an improved method of assaying solid materials and more specifically, to an improved method of evaluating a solid material in respect of its efficiency as a catalyst.

In fields in which catalysts are employed such as the oil industry, the efficiency of the catalysts in carrying out the desired reaction rapidly and in high yields is of utmost importance. While this has been recognized for many years, the art has been unable to determine accurately with methods available heretofore, what the efficiency of a newly prepared catalyst would be prior to actual use. It is common experience, for example, to find that a newly prepared catalyst is low in efficiency or catalytic activity, although as far as can be ascertained the newly prepared catalyst was prepared in the same manner and is of the same chemical composition as a previously prepared catalyst of proven high efficiency or catalytic activity. In order to specify the activity of a catalyst, it is necessary to specify the exact conditions under which the catalyst is to be used.

The theory of catalytic activity is complicated by various factors. For example, while the presence of certain impurities (catalytic poisons) have been found to deleteriously affect catalytic activity, it has been suggested with certain catalysts that the presence of certain other microimpurities appear to be responsible for the activity. It has also been suggested that the distortion or extent of lattice disorder, i. e. spacing between the molecules, is an important factor in catalytic activity. Certain catalysts such as active charcoal, for example, are most active when the molecules are separated by unusually large distances. In addition to these factors, it has been suggested that lattice disorder may be directly affected by the presence of impurities.

The theory of catalysis indicates that certain changes in the electronic structure of the catalyst may be present in the vicinity of the centers of catalytic activity. For example, there is evidence of increased surface para magnetism in certain classes of commercial catalysts.

Attempts heretofore to assay efficiency or catalytic activity of newly prepared catalysts have involved the measuring of the magnetic susceptibilities of the catalysts and the comparison of the X-ray diffraction patterns. Both of these prior methods have been found inadequate or relatively unreliable and far from satisfactory, and as a result, the efficiency or catalytic activity of newly prepared catalysts up to the present time has beeen determined for the most part by empirical tests. Such tests of the "hit or miss" variety have proven particularly objectionable as they are relatively complicated, expensive and time-consuming. The art has long desired a simple, inexpensive method for rapidly assaying and evaluating the efficiency or catalytic activity of newly prepared catalysts.

The principal object of the present invention is to provide a simple and inexpensive method for assaying solid catalysts.

Another object of the present invention is to provide an improved method for rapidly evaluating the efficiency or catalytic activity of solid catalysts.

Other objects of the present invention will be apparent as the description proceeds hereinafter.

When substances in the crystalline state such as minerals, salts etc., are exposed to a sufficient amount of X-rays or radioactivity and then heated, they exhibit a type of luminescence which is called "thermoluminescence." The luminescence is caused by the thermo release of electrons from traps or positions of "metastability" and their return to the parent ions. See Daniels, Saunders and Body, "Science," 109, page 440, April 29, 1949. The present invention utilizes this phenomenon and is based upon the discovery that the amount or degree or character of thermoluminescence exhibited upon heating an irradiated catalyst may be employed as a means for assaying and evaluating efficiency or catalytic activity.

Different catalysts, i. e. catalysts of different chemical composition, generally require different amounts of radiation before exhibiting detectable thermoluminescence. The thermoluminescence characteristics including the amount of radiation required before a catalyst of a particular chemical composition exhibits detectable thermoluminescence (termed herein the "thermoluminescence-radiation threshold") may be readily determined by experimental test. A satisfactory and simple way to make this determination is to expose portions of the catalyst under test to various dosages of X-ray radiations or other radiations (particle, quanta or electromagnetic) from other available sources, and then heat the irradiated portions and observe which portion or portions exhibit thermoluminescence. The lowest radiation which causes the catalyst to exhibit detectable thermoluminescence is the thermoluminescence-radiation threshold of the catalyst. For most purposes a heating range of above about 100° C. to below dull red heat (about 600° C.) is satisfactory, with most irradiated catalysts exhibiting thermoluminescence between 200 to 500° C. The temperature of the surface of the catalyst increases nonatonically with time during the heating process. One can, therefore, speak of the thermoluminescence as a function of time or temperature during a standard heating cycle.

In carrying out the method of the present invention, it is first necessary to expose a catalyst of known high efficiency or satisfactory catalytic activity to radiations at least equivalent to the predetermined thermoluminescence-radiation threshold of the catalyst. This is initially determined as explained above. The irradiated catalyst is then heated under controlled conditions, and the intensity of the luminescence is measured as by light meters such as the recording light meter illustrated in Figure 1 described in detail below. The intensity as a function of time or temperature goes through one or more maxima as illustrated by the glow curves in Figure 2 described below with reference to the example. The intensity-temperature curve is the known standard under the conditions of the test for a satisfactory catalyst of the particular chemical composition tested. A series of standards may be prepared in a similar manner using catalysts of different activities. When a known standard for a satisfactory catalyst of a particular chemical composition has once been determined, it need not be redetermined as long as the conditions used in testing newly prepared catalysts of the same chemical composition are the same as used in determining the known standard.

In assaying a catalyst such as a newly prepared catalyst of unknown efficiency, the catalyst is exposed to the same amount and type of radiation used in determining the known standard or standards, and then heated and the intensity-temperature curve of the thermoluminescence measured, both heating and measuring again being under the same conditions employed in obtaining the known standards. The curves are then compared. If the newly prepared catalyst has an intensity-temperature curve different than the intensity-temperature curve of the known standard, it will have a catalytic activity different than the known standard. By comparing the curve for the newly prepared catalyst of unknown activity with curves obtained for the series of known standards, the exact catalytic activity of the unknown may be ascertained.

The uniformity of catalysts such as newly prepared catalysts of unknown efficiency can also be ascertained by comparing the thermoluminescence as a function of time emitted by various parts of the catalyst. This can be done either visually or by comparing the glow curves obtained with small samples of the catalyst.

In the drawing:

Fig. 1 is a diagrammatic view showing one system for determining catalytic activity; and Fig. 2 is a graph showing the relation between temperature and intensity of thermoluminescence of several catalysts treated in accordance with the process of the invention.

An apparatus for use in measuring the intensity of thermoluminescence is shown diagrammatically in Figure 1. The irradiated sample 10 to be tested is centered on electric furnace 11 which is provided with a variable transformer (not shown) adjusted to control the rate of heating from about 100–600° C. The temperature is measured by the thermocouple shown at 12. The light emitted on heating passes through a plate of glass 13 which acts as a heat shield, and then through condensing lens 14 where it is focused upon the photoelectric cell or photomultiplier tube 15.

The output of the photomultiplier is fed directly to recording galvanometer 16. The preferred galvanometer is a current sensitive galvanometer of the type which causes a spot of light to move laterally on a photo sensitive chart attached to a rotating drum. As illustrated, the galvanometer unit 16 includes a galvanometer 17 having a reflecting mirror 18 for directing a beam of light onto a rotary drum camera 20. The beam of light 19 is produced by a standard light source which is shown at 21 in the drawings. The intensity and temperature are then plotted as shown in Fig. 2.

The purpose of the standardization lamp shown at 21 is to set the galvanometer preliminary to the run (catalytic assay) so that the sensitivity will be the same and the thermoluminescence comparable. Also, if the catalyst is heated so high that the furnace gives off black body radiation, correction must be made if the black body radiation is appreciable.

Other means for recording intensity of the thermoluminescence such as the use of a potentiometer in place of a recording galvanometer shown in Figure 1 may be employed if desired. The apparatus shown is for illustrative purposes only.

The following example will serve to illustrate the present invention.

Example

A sample of an alumina catalyst is first subjected to X-rays for two minutes using an X-ray tube equipped with a copper target and aluminum window, operating at a potential of about 35 kilovolts and an anode current of 10 milliamperes. The irradiated sample is then heated and found to exhibit intense thermoluminescence between about 250 and 450° C. This initial experiment demonstrates that the radiation employed with the specified X-ray tube is at least equivalent to the thermoluminescence-radiation threshold, i. e. that the radiation is of the amount required for alumina to exhibit thermoluminescence, i. e. detectable luminescence.

A sample of an alumina catalyst of predetermined high efficiency or satisfactory catalytic activity is next exposed to X-rays for two minutes using the X-ray tube and conditions described above. The irradiated catalyst is then heated under controlled conditions and the intensity measured as a function of the temperature as shown in Figure 1. The intensity goes through the maximum shown by glow curve "A" in Figure 2 where it approaches the value 50 between 300–400° C. This is a known standard for alumina.

A sample of an alumina catalyst of unknown and undetermined efficiency or catalytic activity is next exposed to X-rays for two minutes using the X-ray tube and conditions described above in the radiation of the catalyst of known high efficiency or satisfactory catalytic activity. The irradiated catalyst is then heated under controlled conditions (i. e. similar to the conditions used with the catalyst of predetermined activity) and the intensity measured as a function of the temperature also as shown in Figure 1. The intensity goes through the maximum shown by glow curve "B" in Figure 2 where it approaches the value 27 between 300–350° C.

The value "50" for the efficient catalyst and the value "27" for the catalyst of unknown efficiency given above, while arbitrary units, give the ratio of the intensities of the luminescence produced on heating the irradiated alumina catalysts under similar conditions. They show the catalyst of unknown catalytic activity to have an activity materially below the known standard. In comparative catalytic tests carried out with the two catalysts, the catalyst which exhibited the low intensity (shown by curve "B") proved to be relatively inefficient and of unsatisfactory catalytic activity. The two catalysts, for example, differed in activity by a factor of 10, i. e. in a given time and under identical conditions the good catalyst produced ten times the amount of dehydrogenation of cyclohexane as did the poor catalyst.

In place of the alumina catalyst employed in the illustrative example, the method of the present invention may be employed to determine efficiency or catalytic activity of other solid catalysts such as silica gel, metallic oxide catalysts such as chromium oxide, zinc oxide, iron oxide and the like. The method of the present invention may also be advantageously employed to determine uniformity of catalysts and to evaluate catalytic activity of solid catalysts used in different types of catalytic processes such as catalytic cracking, catalytic dehydrogenation, catalytic hydro-forming (cracking in the presence of hydrogen), catalytic alkylation, catalytic isomerization, catalytic polymerization, etc. The method of the present invention gives the art a relatively simple and inexpensive means for rapidly and accurately assaying and evaluating catalytic activity of the type long desired.

We claim:

1. A method of evaluating a solid substance in respect of its efficiency as a catalyst, which comprises exposing the substance to radiation, subsequently heating said substance so exposed, observing the effect produced by said heating in respect of luminescense of the substance, and comparing said effect with a known standard.

2. A method of evaluating a solid substance in respect of its efficiency as a catalyst, which comprises exposing the substance to X-ray radiation, subsequently heating said substance so exposed, observing the effect produced by said heating in respect of luminescence of the substance, and comparing said effect with a known standard.

3. A method of evaluating catalytic activity of solid catalysts of similar chemical composition, which comprises determining the intensity-temperature curve of thermoluminescence of a catalyst of known activity by exposing the catalyst of known activity to radiation at least equivalent to the thermoluminescence-radiation threshold of the cataylst, heating the resulting irradiated catalyst, measuring the intensity-temperature curve of the thermoluminescence, determining the intensity-temperature curve of thermoluminescence of a catalyst of unknown activity in the same manner and under the same conditions as those employed in determining the intensity-temperature curve of thermoluminescence of the catalyst of known activity, and then comparing the intensity-temperature curves of the thermoluminesence of the two catalysts.

4. A method of evaluating catalytic activity of metallic oxide catalysts of similar chemical composition, which comprises determining the intensity-temperature curve of thermoluminescence of a catalyst of known activity by exposing the catalyst of known activity to radiation at least equivalent to the thermoluminescence-radiation threshold of the catalyst, heating the resulting irradiated catalyst, measuring the intensity-temperature curve of the thermoluminescence, determining the intensity-temperature curve of thermoluminescence of a catalyst of unknown activity in the same manner and under the same conditions as those employed in determining the intensity-temperature curve of thermoluminescence of the catalyst of known activity, and then comparing the intensity-temperature curves of the thermoluminescence of the two catalysts.

5. A method of evaluating catalytic activity of alumina catalysts of similar chemical composition, which comprises determining the intensity-temperature curve of thermoluminescence of an alumina catalyst of known activity by exposing the catalyst of known activity to radiation at least equivalent to the thermoluminescence-radiation threshold of the catalyst, heating the resulting irradiated catalyst, measuring the intensity-temperature curve of the thermoluminescence, determining the intensity-temperature curve of thermoluminescence of an alumina catalyst of unknown activity in the same manner and under the same conditions as those employed in determining the intensity-temperature curve of thermoluminescence of the catalyst of known activity, and then comparing the intensity-temperature curves of the thermoluminescence of the two catalysts.

6. A method of evaluating catalytic activity of chromium oxide catalysts of similar chemical composition, which comprises determining the intensity-temperature curve of thermoluminescence of a chromium oxide catalyst of known activity by exposing the catalyst of known activity to radiation at least equivalent to the thermoluminescence-radiation threshold of the catalyst, heating the resulting irradiated catalyst, measuring the intensity-temperature curve of the thermoluminescence, determining the intensity-temperature curve of thermoluminescence of a chromium oxide catalyst of unknown activity in the same manner and under the same conditions as those employed in determining the intensity-temperature curve of thermoluminescence of the catalyst of known activity, and then comparing the intensity-temperature curves of the thermoluminescence of the two catalysts.

7. A method of evaluating catalytic activity of silica gel catalysts of similar chemical composition, which comprises determining the intensity-temperature curve of thermoluminescence of a silica gel catalyst of known activity by exposing the catalyst of known activity to radiation at least equivalent to the thermoluminescence-radiation threshold of the catalyst, heating the resulting irradiated catalyst, measuring the intensity-temperature curve of the thermoluminescence, determining the intensity-temperature curve of thermoluminescence of a silica gel catalyst of unknown activity in the same manner and under the same conditions as those employed in determining the intensity-temperature curve of thermoluminescence of the catalyst of known activity, and then comparing the intensity-temperature curves of the thermoluminescence of the two catalysts.

8. A method of assaying a solid substance in respect of its efficiency as a catalyst, which comprises exposing the substance to X-ray radiation at least equivalent to the thermoluminescence-radiation threshold, heating the resulting irradiated substance over a temperature range of about 200°–500° C., measuring the intensity-temperature curve of the resulting thermoluminescence, and comparing the intensity-temperature curve so measured with the intensity-temperature curve obtained by assaying under similar conditions a substance of the same chemical composition of known catalytic activity.

9. A method of evaluating catalytic activity, which comprises assaying an alumina catalyst of known satisfactory activity by exposing said catalyst of known activity to X-ray radiation at least equivalent to the thermoluminescence-radiation threshold of alumina, heating the resulting irradiated alumina over a temperature range of about 200°–500° C., measuring the intensity-temperature curve of the resulting thermoluminescence, assaying an alumina catalyst of unknown activity in the same manner and under the same conditions as those employed in assaying the catalyst of known activity, and then comparing the intensity-temperature curves produced on thermoluminescence.

10. A method of evaluating catalytic activity, which comprises assaying a plurality of solid catalysts of the same chemical composition and of known different activities by exposing said catalysts of known activities to radiation at least equivalent to the thermoluminescence-radiation threshold, heating the resulting irradiated catalysts, measuring the intensity-temperature curves of the resulting thermoluminescence, assaying a catalyst of the same chemical composition and of unknown activity in the same manner and under the same conditions as those employed in assaying the catalysts of known activities, and then comparing the intensity-temperature curves produced on thermoluminescence.

11. A method of determining uniformity of catalysts, which comprises exposing a solid catalyst to radiation at least equivalent to the thermoluminescence-radiation threshold, and then heating the resulting irradiated catalyst and observing and comparing the thermoluminescence at various points.

CHARLES A. BOYD.
JOSEPH HIRSCHFELDER.

REFERENCES CITED

The following references are of record in the file of this patent:

UNITED STATES PATENTS

| Number | Name | Date |
|---|---|---|
| 2,451,885 | Stevens et al. | Oct. 19, 1948 |
| 2,483,500 | Long | Oct. 4, 1949 |

OTHER REFERENCES

Luminescence of Liquids and Solids by P. Pringsheim et al., Interscience Publishers Inc., New York, 1946, pp. 56–58, 97 and 98.